Jan. 9, 1951 J. H. HECKERT 2,537,527
NONLOOSENING SAFETY BOLT
Filed May 1, 1947 2 Sheets-Sheet 2
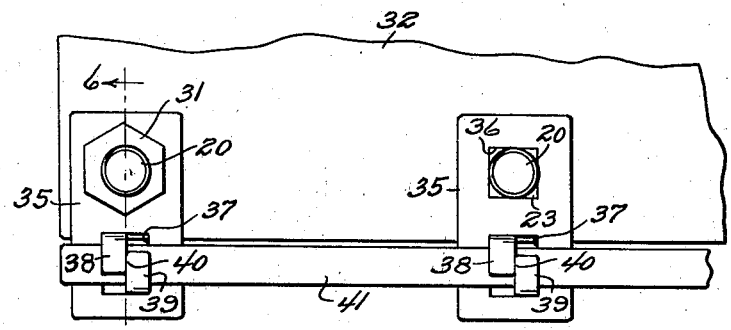
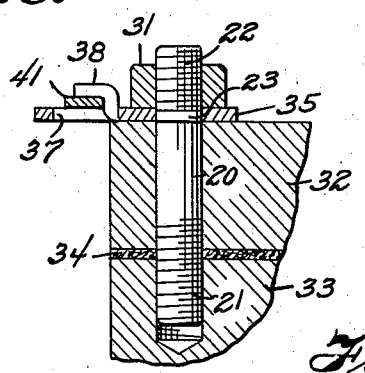
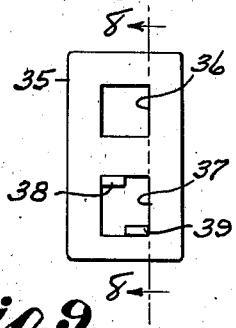
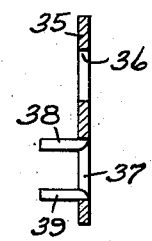
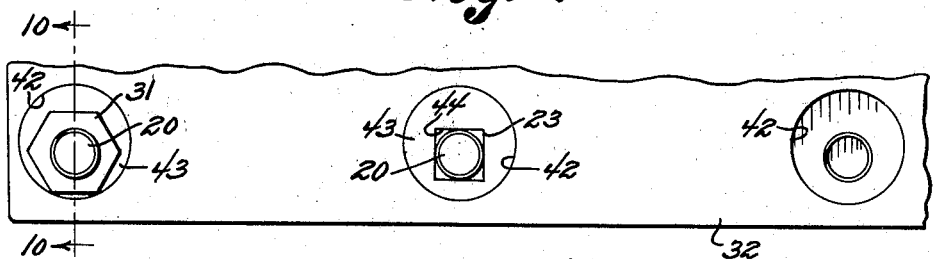
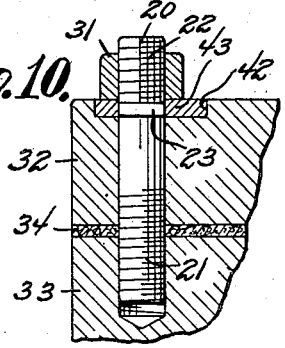
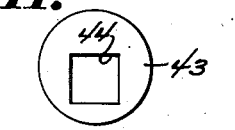
INVENTOR.
James H. Heckert
BY Victor J. Evans & Co.
ATTORNEYS Patented Jan. 9, 1951

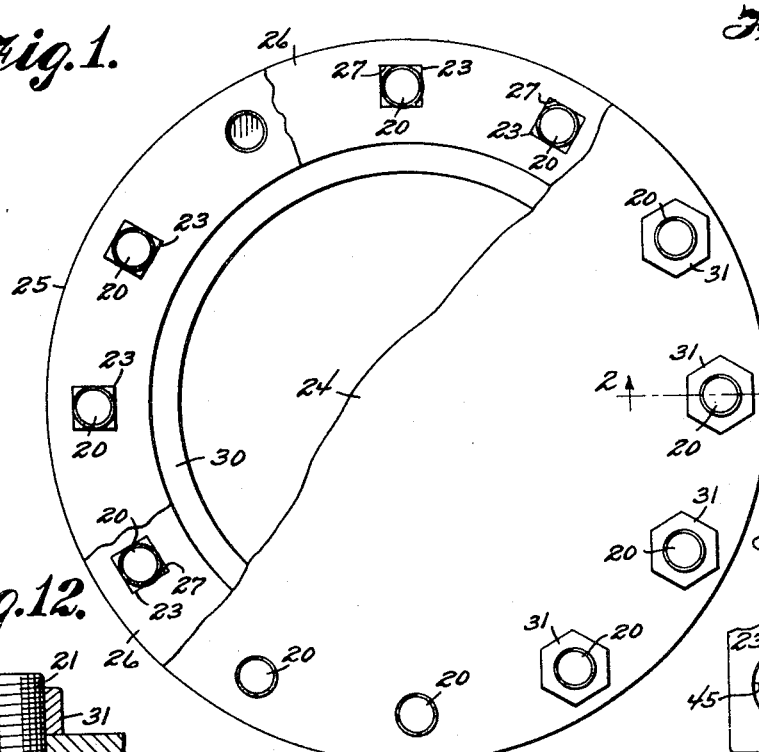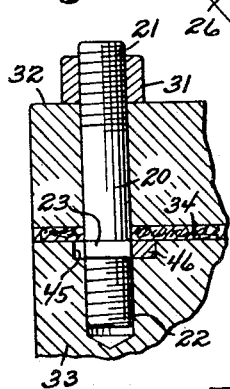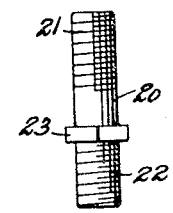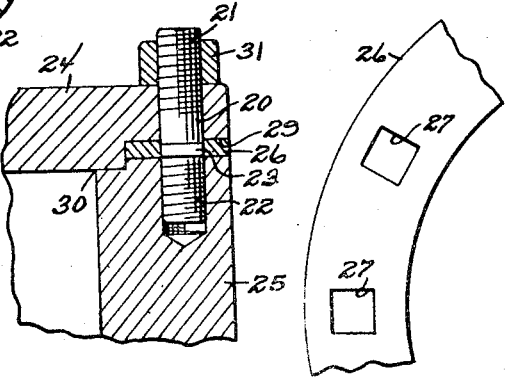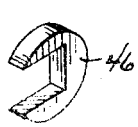

2,537,527

UNITED STATES PATENT OFFICE 2,537,527

NONLOOSENING SAFETY BOLT

James H. Heckert, Dravosburg, Pa.

Application May 1, 1947, Serial No. 745,297

1 Claim. (Cl. 151—32)

This invention relates to a non-loosening safety bolt that is designed to be used in any device where it is desirable to prevent the bolt from loosening, yet will permit the bolt to be removed from the device without damaging the bolt during its removal by the tool accomplishing its purpose.

An object of the invention is to provide a bolt which is provided with a retaining means that will prevent loosening of the bolt, but can be removed to permit removal of the bolt as desired.

With the above and other objects and advantages in view, the invention consists of the novel details of construction, arrangement and combination of parts more fully hereinafter described, claimed and illustrated in the accompanying drawings in which:

Figure 1 is a top plan view partly broken away, showing an embodiment of the invention in use with a man hole or similar circular cover;

Figure 2 is a sectional view on the line 2—2 of Figure 1;

Figure 3 is a fragmentary plan view of the locking plate for the bolt;

Figure 4 is an elevational view of a bolt embodying the invention;

Figure 5 is a plan view of another form of the invention in use with a motor block assembly;

Figure 6 is a sectional view on the line 6—6 of Figure 5;

Figure 7 is a plan view of a locking plate used with the form of the invention shown in Figure 5;

Figure 8 is a sectional view on the line 8—8 of Figure 7;

Figure 9 is a fragmentary elevational view of another form of the invention;

Figure 10 is a sectional view on the line 10—10 of Figure 9;

Figure 11 is a plan view of the locking member for the form of the invention shown in Figure 9;

Figure 12 is a fragmentary sectional view of another form of the invention;

Figure 13 is a fragmentary plan view of the bolt and locking means used therefor;

Figure 14 is a perspective view of the locking means used in the form of the invention shown in Figure 13 and Figure 15 is a perspective view of another form of locking means.

Referring more in detail to the drawings, and more especially to Figure 4, the reference numeral 20 designates the bolt forming the embodiment of the invention. The upper and lower ends of the bolt may be either right or left hand threads or may be reversely threaded as shown at 21 and 22 respectively, and a square shaped collar 23 is formed on the stud intermediate the threaded ends 21 and 22. It is to be understood, however, that the shape of the collar may be varied as desired.

In Figures 1 to 3, inclusive, a circular plate or man hole cover 24 is to be secured to a tubular member 25, by means of the bolt 20.

The bolt is threaded into the member 25, as shown in Figure 2, and a ring shaped member 26 having square shaped openings 27 relatively spaced thereon is placed over the bolts 20 so that the openings 27 will engage the collars 23 to prevent the bolt from being unscrewed from the members 25. The cover 24 is then placed over the bolts 20 and an annular recess 29 adjacent the outer periphery thereof engages the member 26, and the cover 24, and member 25 is mortised as shown at 30; then when a nut 31 is threaded onto the bolt the cover is firmly retained in place without danger of the bolt becoming loosened with the resulting loosening of the cover 24.

If it is desired to remove the bolt for any reason, nuts 31 are removed, and then the cover 24 and member 26, and a wrench can be engaged with the collar 23 for the removal of the bolt.

In Figures 5 to 8, inclusive, the bolt 20 is shown in use with a cylinder head 32, and a motor block 33. In this instance, the bolt 20 is used for replacing old bolts that have been broken off during the removing thereof, which necessitates drilling the old bolts out of and retapping the holes in the block. By replacing the old bolts with the bolt 20, danger of breaking the bolts 20 will be eliminated, since the bolt 20 does not have to fit as tight as the old bolts to prevent loosening thereof.

As shown in Figure 6, the head gasket 34 is placed on the block, the head is fitted thereto, and then the bolts 20 are inserted into the aligned openings therefor in the head and block and tightened until the collar 23 is flush with the upper surface of the head 32.

A locking plate 35 having a square shaped opening 36 is then placed on each bolt so that the opening 36 engages the shoulder 23. The nuts 31 are then threaded on the bolts 20 and drawn tight.

A cutout 37 in each plate 35 forms a pair of opposed ears 38 and 39, since the ears are split by the central line 40 during the forming of the ears. A bar 41 is then inserted between the ears 38 and 39 on the plate 35 on each bolt, and the ears are bent over and then welded to the bar to form a unitary assembly. This is done in this manner since all bolts are not equally spaced, and it is better to form the body means as described for each particular motor.

In the form shown in Figures 9 to 11 inclusive, the head 32 is provided with an offset counter bore 42, which is eccentric to the opening therein, for the bolt, which is secured thereto, and a disc 43 provided with an offset square shaped opening 44 is placed in the bore 42 and engages the shoulder 23 of the bolt 20 and the nut 31 is then screwed onto the bolt as previously described. Thus all of the locking means previously described, which would mar the appearance of the motor, is eliminated.

In Figures 12 to 14, inclusive, the block 33 is provided with an offset counter bore 45 which is eccentric to the opening for the bolt, as in Figures 9 to 11, inclusive, but in this instance, a horse-shoe shaped washer 46 is placed in the bore 45 to engage the shoulder 23 and the gasket 34 and head 32 and nuts 31 are applied in the conventional manner.

In Figure 15, there is shown a retaining means 47, which is of the shape of a segment of a circle and which may be substituted for the disc 43 or the washer 46 in the head 32 or the block 33. The head and block are then assembled as previously described.

There has thus been provided a bolt which may be used in any place desired where a bolt that will not become loosened is necessary in the assembly.

The locking means for the bolt can be of several forms and those illustrated are not intended to limit the invention to the forms shown.

It is also believed that from the foregoing description, the construction and operation of the invention will be apparent to those skilled in the art, and it is to be understood that changes in the minor details of construction may be resorted to, provided they fall within the spirit of the invention and the scope of the appended claim.

Having thus described the invention, what is claimed as new and desired to be secured by Letters Patent is:

In a means for retaining a man hole cover on a tubular member and the man hole cover having an annular recess in the lower surface thereof at the periphery thereof and provided with relatively spaced smooth bores therein, and the tubular member having an annular projection thereon at the periphery thereof and having relatively spaced threaded bores therein and the projection adapted to enter the recess, the improvement comprising a ring shaped member having a plurality of relatively spaced square shaped openings therein adapted to be placed on the projection and to be received in the recess intermediate of the cover and the tubular member and the openings are placed in said ring shaped member so that two of the sides of the openings are parallel to the curvature of the ring shaped member, a bolt having upper and lower threaded portions and a square shaped smooth intermediate portion and the lower threaded portion of the bolt is adapted to be received in the bore of the tubular member, and the square intermediate portion is received in the openings in the ring shaped member and the upper threaded portion of the bolt passes through the bore in the cover to receive a nut thereon which when tightened will retain the cover on the tubular member.

JAMES H. HECKERT.

REFERENCES CITED

The following references are of record in the file of this patent:

UNITED STATES PATENTS

| Number | Name | Date |
|---|---|---|
| 525,431 | Sparks | Sept. 4, 1894 |
| 771,935 | Reynolds | Oct. 11, 1904 |
| 1,165,615 | McGee | Dec. 28, 1915 |
| 1,332,268 | Nainka | Mar. 2, 1920 |
| 1,384,915 | Parks | July 19, 1921 |
| 1,404,290 | Hleb | Jan. 24, 1922 |
| 1,711,018 | Ellis | Apr. 30, 1929 |
| 2,337,412 | Post | Dec. 21, 1943 |
| 2,428,551 | Burger | Oct. 7, 1947 |
| 2,469,441 | Pitisci | May 10, 1949 |